United States Patent
Long et al.

(10) Patent No.: US 6,791,289 B1
(45) Date of Patent: Sep. 14, 2004

(54) INTERMITTENT DRIVING MECHANISM

(75) Inventors: Sasha Long, Oxford, ME (US); James T. Stenberg, Portland, ME (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/409,129

(22) Filed: Apr. 9, 2003

(51) Int. Cl.$^7$ ................................................. H02D 1/04
(52) U.S. Cl. ........................ 318/444; 318/445; 318/443
(58) Field of Search ............................ 318/444, 9, 445, 318/443; 74/820; 378/12

(56) References Cited

U.S. PATENT DOCUMENTS

| | | | |
|---|---|---|---|
| 4,018,092 A | | 4/1977 | Fletcher et al. ............... 74/96 |
| 4,267,003 A | * | 5/1981 | Mesch et al. ............... 156/356 |
| 4,362,444 A | * | 12/1982 | Watkins ....................... 408/17 |
| 4,512,214 A | * | 4/1985 | Surman ....................... 74/820 |

OTHER PUBLICATIONS

Precision Geneva Mechanisms (Stock Drive Products), pp 1–2.
Geneva Mechanism (Berg Mechanical Components), p1.
Design of a Geneva Mechanism with Curved Slots, www.mie.utoronto.ca/staff/projects/cleghorn/Research/r222.html, p 1.
Geneva Mechanism: its history, function, and weaknesses, http://em–ntserver.unl.edu/Mechanics–Pages/em373honors–s2001/em373/geneva/geneva.htm, pp 1–2.
Definition of Class 74, www.micropat.com/classdef/CLS-DEF/class074/s436000.html, p 1.
Mechanisms for Automation, ME 459 Advanced Topics in Design and Manufacturing, web.mur.edu/~liou/ME459/genevas/genevas.html, pp 1–3.
Examples of Mechanisms, 4.2 Geneva Wheel, www–2.cs.cmu.edu/~rapidproto/mechanisms/examples.html, pp 1–2.
Elements & Output Segments, www.cycloindex.com/cycpg2, htm, pp 1–2.
Operation & Standard Curves, www.cycloindex.com/cycpg3.htm, pp 1–3.

* cited by examiner

Primary Examiner—Karen Masih
(74) Attorney, Agent, or Firm—Baker & Hostetler LLP

(57) ABSTRACT

An intermittent driving mechanism is disclosed that includes a driving member having a slot formed in a channel. A driven member of the intermittent driving mechanism is rotatably coupled to the driving member and includes a pin that engages the slot after the driving member, when rotated, causes the pin of the driven member to enter the channel of the driving member.

23 Claims, 4 Drawing Sheets

INTERMITTENT DRIVING MECHANISM

FIELD OF THE INVENTION

The present invention relates generally to timing or rotational devices. More particularly, the present invention is directed to intermittent driving mechanisms that provide for controlled movement and torque output of a driven member.

BACKGROUND OF THE INVENTION

Timing devices are utilized to cause a particular event to occur at a specific moment in time. Intermittent gear mechanisms, such as Geneva drives, are timing devices that output intermittent rotation motion of a gear member.

Shown in FIG. 1 is an example of a Geneva drive 10 that is known in the art. The Geneva drive 10 includes a driving member 12 that has a pin 14, along with a gear/driven member 16 that has slots 18–26. During operation, the driving member 12 will continuously rotate, for example, in a counter-clockwise manner. The driven member 16 begins to rotate when the portion of the driving member 12 containing the pin 14 rotates to a position where it engages one of the slots 18–26. As the driving member 12 continues to rotate, the pin 14 of the driving member 12 disengages from, for example, a slot 26, and the driven member 16 comes to a stopped position, while the driving member 12 continues to rotate until it has completed a complete revolution, i.e., a 360 degree rotation.

Typically, the driven member 16 is coupled to a load, for example, a four position switch of an antenna system. Each time the pin 14 engages one of the slots 18–26, the switch moves from one position to another. Each switch position corresponds to the coupling of two predetermined transmission line portions. After the pin 14 disengages from one of the slots 18–26, the driven member 16 comes to a stop and a signal is transmitted through the coupled transmission line portions until the pin 14 engages a second one of the slots 18–26 during the next revolution of the driving member 12.

Although a Geneva drive is able to drive its driven member intermittently, Geneva drives suffer from a sharp increase in speed and a sharp decrease in torque output from the driven member due to the interaction between the pin of the driving member and the slots of the driven member. The slot design of Geneva drives has a steep slope. As a result, the motion of the pin is not easily controlled when the pin drops from the top of a slot to the bottom of the slot.

The impact of the pin when it hits the bottom of a slot causes a load coupled to the Geneva drive to suffer from uncontrolled celebration. The load is coupled to the drive via a coupler, and the drive will be subjected to the force associated with the acceleration of the load when the pine 14 enters one of the slots (18–26). However, the uncontrolled acceleration that occurs when a pin enters a slot of a Geneva drive causes excessive wear and tear on the load coupled to drive, drive due to the force exerted on the drive from the uncontrolled acceleration of the load.

Accordingly, it would be desirable to provide an intermittent driving mechanism that provides controlled motion of the driven members. It would also be desirable to provide intermittent driving mechanisms that prevent excessive wear and tear to the intermittent driving mechanisms and any components that are coupled to it. Further, it would be desirable to provide intermittent driving mechanisms that provide constant speed and torque output from their driven members during angular rotation of the driven members.

SUMMARY OF THE INVENTION

In one aspect of the present invention, an intermittent driving mechanism is provided that includes a driving member and a driven member. The driven member is rotatably coupled to the driving member and rotates when the pin engages a first arcuate portion of a channel of the driving member.

In another aspect of the present invention, an intermittent driving mechanism is provided wherein the driven member includes an arm and a pin coupled to the arm.

In another aspect of the present invention, an intermittent driving mechanism is provided wherein the driving member includes a rotating member and a port.

In another aspect of the present invention, an intermittent driving mechanism is provided that includes a driving shaft that is positioned within the port.

In another aspect of the present invention, an intermittent driving mechanism is provided that includes a motor coupled to the driving shaft.

In another aspect of the present invention, an intermittent driving mechanism is provided wherein the pin is one of four pins.

In another aspect of the present invention, an intermittent driving mechanism is provided wherein the arm is one of four arms.

In another aspect of the present invention, an intermittent driving mechanism is provided wherein the driven member rotates one-fourth of a revolution for every revolution of the driving member.

In another aspect of the present invention, an intermittent driving mechanism is provided wherein the driven member comes to a stop position when the pin exits the second arcuate portion.

In another aspect of the present invention, an intermittent driving mechanism is provided wherein a slot is positioned between the first arcuate portion and the second arcuate portion.

In another aspect of the present invention, an intermittent driving mechanism is provided wherein the plate is circular.

In yet another aspect of the present invention, a method for operating an intermittent driving mechanism is provided that includes rotating a driving member, and moving a pin of a driven member in an arcuate channel of the driving member to cause the driven member to rotate.

In another aspect of the present invention, a method for operating an intermittent driving mechanism is provided wherein the channel includes a first arcuate portion and a second arcuate portion and the slot is positioned intermediate the first and second arcuate portions.

In another aspect of the present invention, a method for operating an intermittent driving mechanism is provided that includes rotating the driving member one complete revolution and rotating the driven member one-quarter of a revolution.

Further in another aspect of the present invention, an intermittent driving system is provided that includes a means for rotating a driving member and a means for moving a pin of a driven member into an arcuate channel of the driving member.

Moreover, in another aspect of the present invention, an intermittent driving mechanism is provided that includes a driving member having a slot formed in a channel, and a driven member rotatably coupled to the driving member. The driven member has a pin that engages the slot of the driving member after the driving member causes the pin to enter the channel.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENTS OF THE INVENTION

Figure 1:
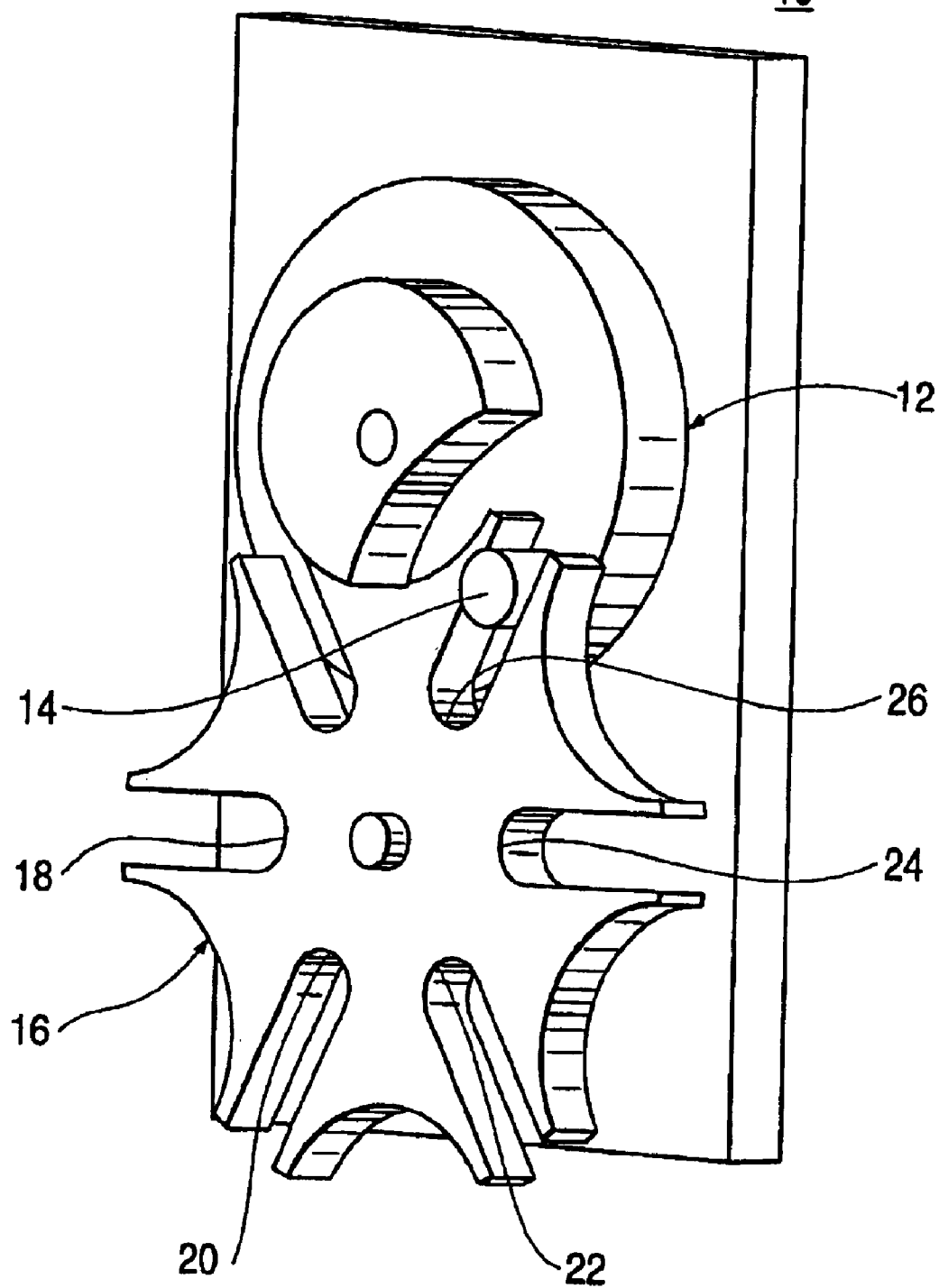
FIG. 1 illustrates a Geneva drive.
Figure 2:
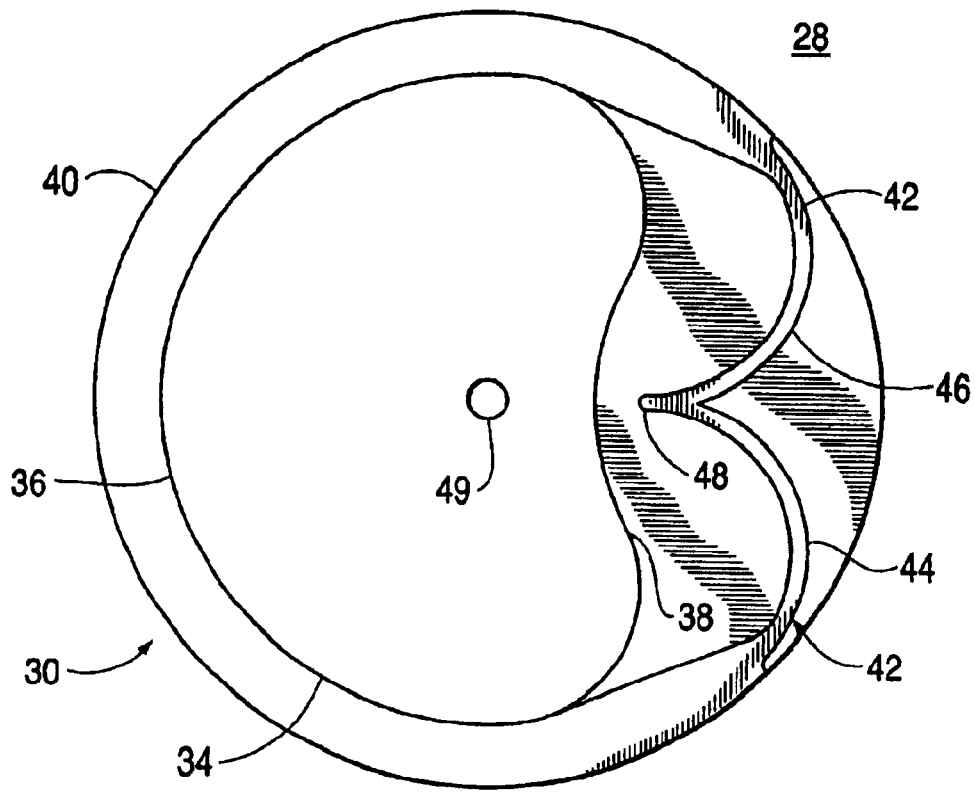
FIG. 2 illustrates a front elevation view of a driving member in accordance with the present invention.
Figure 3:
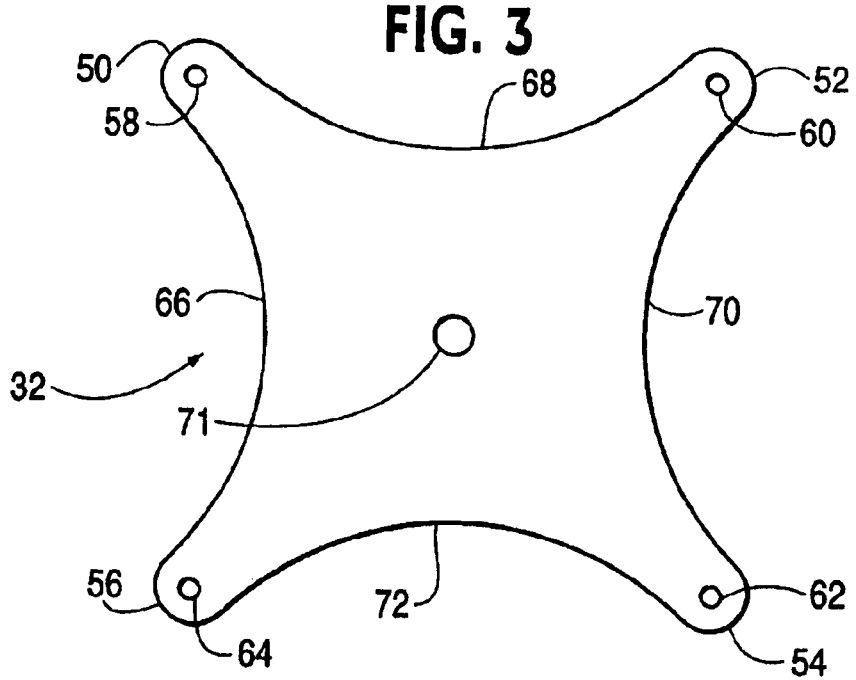
FIG. 3 is a front elevational view of a driven member of an intermittent driving mechanism in accordance with the present invention.

Referring now to the figures, wherein like reference numerals indicate like elements, in FIGS. 2 and 3 there is shown a design of an intermittent driving mechanism 28 in accordance with the present invention that avoids excessive wear and tear of the intermittent driving mechanism 28 and any components that may be coupled to it. The intermittent driving mechanism 28 includes, a driving member 30 and a driven member 32. In a preferred embodiment of the present invention, the driving member 30 includes a rotating member 34, which is circular arcuate in shape and has a convex side 36 and an arcuate concave side 38. The circular arcuate member 36 is coupled to a circular plate 40. A channel 42 traverses a portion of the plate and includes a first arcuate portion 44 and a second arcuate portion 46. Positioned intermediate the first and second arcuate portions 44, 46 is a slot 48. The slot 48 is the portion of the channel 42 formed by the intersection of the two arcuate portions 44, 46.

A port 49 may be utilized to couple a motor to the driving member 30 via a driving shaft. It should be understood by one of ordinary skill in the art that the size and shape of the rotating member, channel and slot may vary.

In the preferred embodiment of the present invention, the driven member 32 has four arms 50–56 and four pins 58–64. Each of the pins 58–64 is coupled to an arm 50–56. Positioned between each arm is a concave portion 66–72 that accommodates the rotating member 36. Accordingly, the novel design of the intermittent driving mechanism 28 provides for controlled motion of the driven member 32 during the time period when the driven member 32 is in motion. Accordingly, an intermittent driving mechanism in accordance with the present invention does not suffer from a sharp decrease in torque and a sharp increase in speed when the driven member enters the channel 42. The shape of the driven member 32, the number of arms 50–56, and the number of pins, may vary. However, it should be understood by one of ordinary skill in the art that the greater the number of arms 50–56, the less wear and tear on the driven member 32. In an exemplary embodiment of the present invention, the driven member has one arm 50–56, and a motor is utilized to move the pin 60 into the channel from an opposite direction. Accordingly, one arm 50–56 may be utilized to provide more than one rotation output from the driven member 32.

With four arms 50–56, the driven member 32 of the intermittent driving mechanism 28 will stop four times before one revolution of the driven member is complete. The number of stops per revolution of the driven member 32 is maximized with four arms 50–56, rather than less. Accordingly, the driven member rotates minimally to accomplish intermittent motion, and the lifetime of the intermittent driving mechanism 28 is extended.

Figure 4:
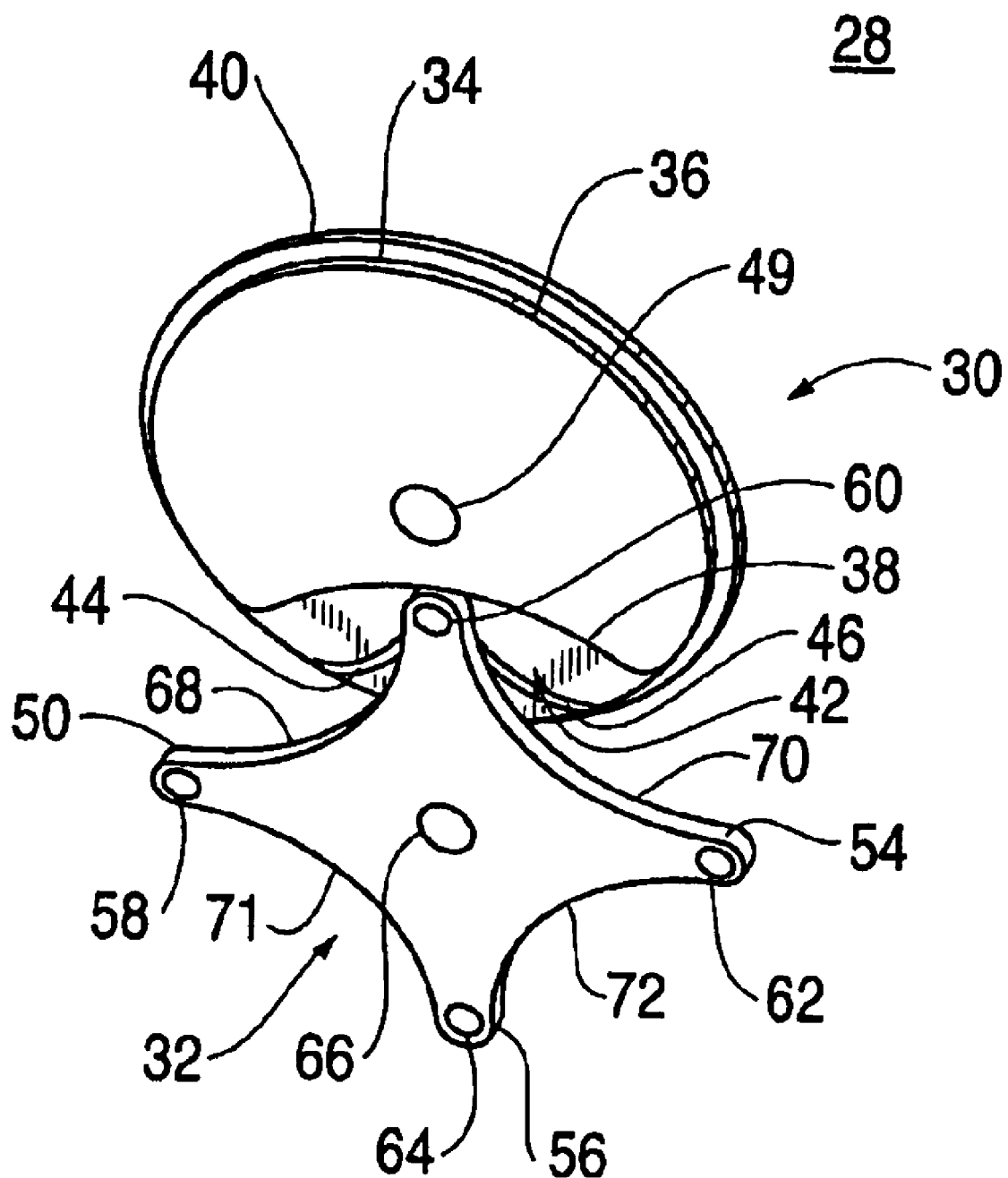
FIG. 4 illustrates a front elevation view of an intermittent driving mechanism in accordance with the present invention.

During operation, as shown in FIG. 4, the driven member 32 is rotatably coupled to the driving member 30. During a single counterclockwise revolution of the driving member 30, the driven member 32 rotates one-quarter of a revolution. The driven member 30 begins to rotate during the rotation of the driving member 30 when one of the pins 60 of the driven member 32 enters the first arcuate portion 44 of the channel 42. The pin 60 of the driven member 32 will continue to move along the slot 48 where it comes to a stop position before moving into the second arcuate portion 46 of the channel 42. When the pin 60 exits the second arcuate portion 46, the driven member 32 will cease to rotate and remain in a stop position until the revolution of the driving member 30 is complete.

The driven member 32 will not rotate again until a second pin 58 of the driven member 32 engages the channel 42 of the driving member 30 during a second revolution of the driving member 32. The convex side 36 stabilizes the driven member 32 through the remaining rotation of the driving member 30 by its interaction with the concave portion 68 of the driven member 32. The driven member 32 may include a port 71 for coupling a load to the driven member 32 via, for example, a coupling shaft.

It should be recognized that the intermittent drive of the present invention can operate to cause counterclockwise movement of the driven member 32 or clockwise movement of the driven member 32 by rotating the driving member counterclockwise or clockwise, respectively.

Figure 5:
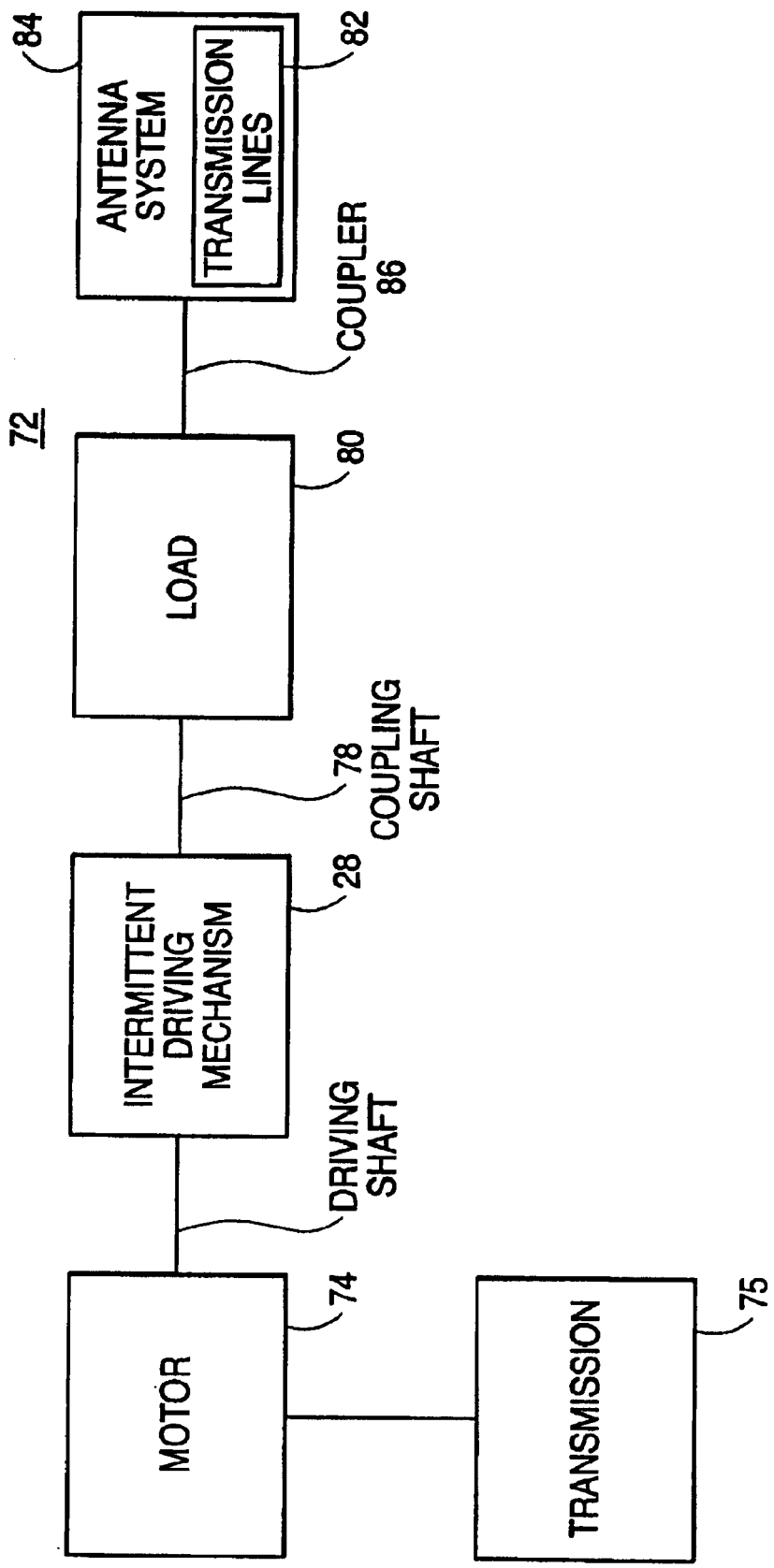
FIG. 5 illustrates a block diagram of an intermittent driving system in accordance with the present invention.

Shown in FIG. 5 is a block diagram of a system 72 that includes an intermittent driving mechanism 28 in accordance with the present invention. The intermittent driving mechanism 28 is coupled to a motor 74 via, for example, a driving shaft 76. A transmission 75 may be coupled to the motor to vary the speed of the motor, and accordingly, the timing associated with the intermittent driving mechanism 28. Together the motor 74 and the driving shaft 76 are utilized to rotate a driving member 30 of the intermittent driving mechanism 28. The intermittent driving mechanism 28 is coupled to a load 80, for example, a coaxial switch, via a coupling shaft 78. The intermittent driving mechanism 28 is utilized to move the load 80 between, for example, four different positions. In a preferred embodiment of the present invention, the load 80 is coupled to transmission lines 82 of an antenna system 84 via a coupler 86. Each position of the load 80 corresponds to one of four different transmission line coupling pairs. The load 80 is utilized to couple different portions of the transmission lines 82 together at different times. Each time one of the pins 58–64 moves into the slot 48, a different pair of the transmission lines 82 will be coupled.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An intermittent driving mechanism, comprising:
   a driving member having a plate and a channel; and
   a driven member having a pin, wherein said driven member is rotably coupled to the driving member and rotates when the pin engages a first arcuate portion of the channel of the driving member.

2. The intermittent driven mechanism of claim 1, wherein the driven member includes an arm and the pin is coupled to the arm.

3. The intermittent driving mechanism of claim 1, wherein the driving member comprises a rotating member and a port, and wherein a driving shaft is positioned within the port.

4. The intermittent driving mechanism of claim 3, further comprising a motor, said motor coupled to said driving shaft.

5. The intermittent driving mechanism of claim 1, wherein each of the four arms has a pin and wherein the driven member has four arms.

6. The intermittent driving mechanism of claim 1, wherein the driven member rotates one-fourth of a revolution for every revolution of the driving member.

7. The intermittent driving mechanism of claim 1, wherein the channel further comprises a second arcuate portion.

8. The intermittent driving mechanism of claim 7, wherein the driven member ceases to rotate after the pin exits the second arcuate position and the driving member continues to rotate.

9. The intermittent driving mechanism of claim 7, wherein a slot is positioned between the first arcuate portion and the second arcuate portion.

10. The intermittent driving mechanism of claim 9, wherein the slot is formed by the first arcuate portion and the second arcuate portion.

11. The intermittent driving mechanism of claim 1, wherein the driving member comprises a convex side and the driven member comprises a concave portion, and wherein the convex side and the concave portion interact to lock the driven member in place.

12. A method for operating an intermittent driving mechanism, comprising:
    rotating a driving member; and
    moving a pin of a driven member in an arcuate channel of the driving member to cause said driven member to rotate.

13. The method of claim 12, further comprising maintaining the driven member in a stop position before the pin exits the channel.

14. The method of claim 12, wherein the driven member rotates one-fourth of a revolution for every complete revolution of the driving member.

15. The method of claim 12, further comprising varying the speed of a motor coupled to the driving member.

16. The method of claim 12, further comprising:
    stopping rotation of the driven member after the pin exits the channel.

17. The method of claim 11, further comprising changing a position of a switch coupled to the driving member.

18. An intermittent driving system, comprising:
    means for rotating a driving member; and
    means for moving a pin of a driven member into an arcuate channel of the driving member.

19. The system of claim 18, further comprising means for maintaining the driven member in a stop position before the pin enters the channel.

20. The system of claim 18, further comprising a load coupled to the driven member.

21. The system of claim 20, wherein the load is a switch.

22. The system of claim 21, further comprising transmission lines of an antenna system, and wherein the switch couples different portions of the transmission lines when, during rotation of the driving member, the pin engages a slot of the arcuate channel.

23. An intermittent driving mechanism, comprising:
    a driving member having a slot formed in a channel; and
    a driven member that is rotatably coupled to the driving member and that has a pin that engages the slot after the driving member causes the pin to enter the channel.

* * * * *